(No Model.) 2 Sheets—Sheet 2.
W. A. PECK & R. A. BRIGHT.
CIGAR WRAPPING MACHINE.
No. 451,735. Patented May 5, 1891.
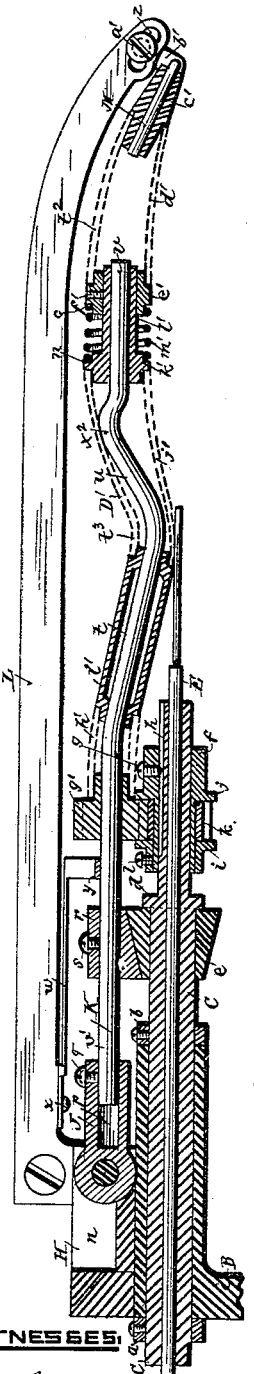
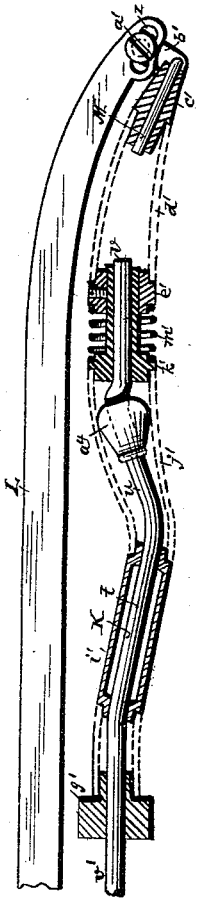
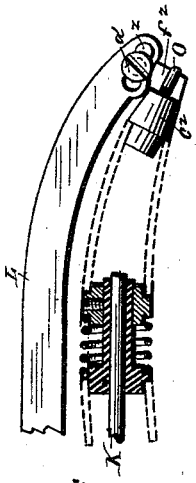
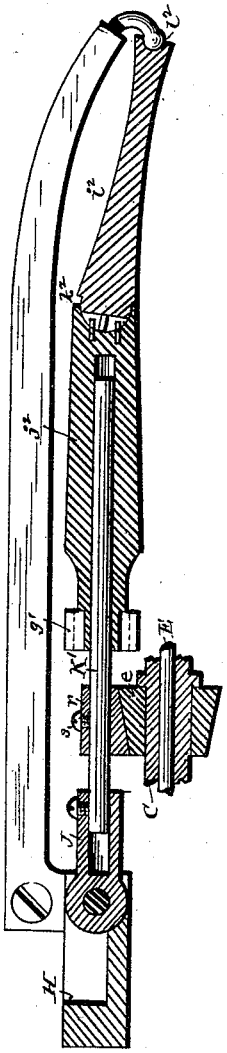

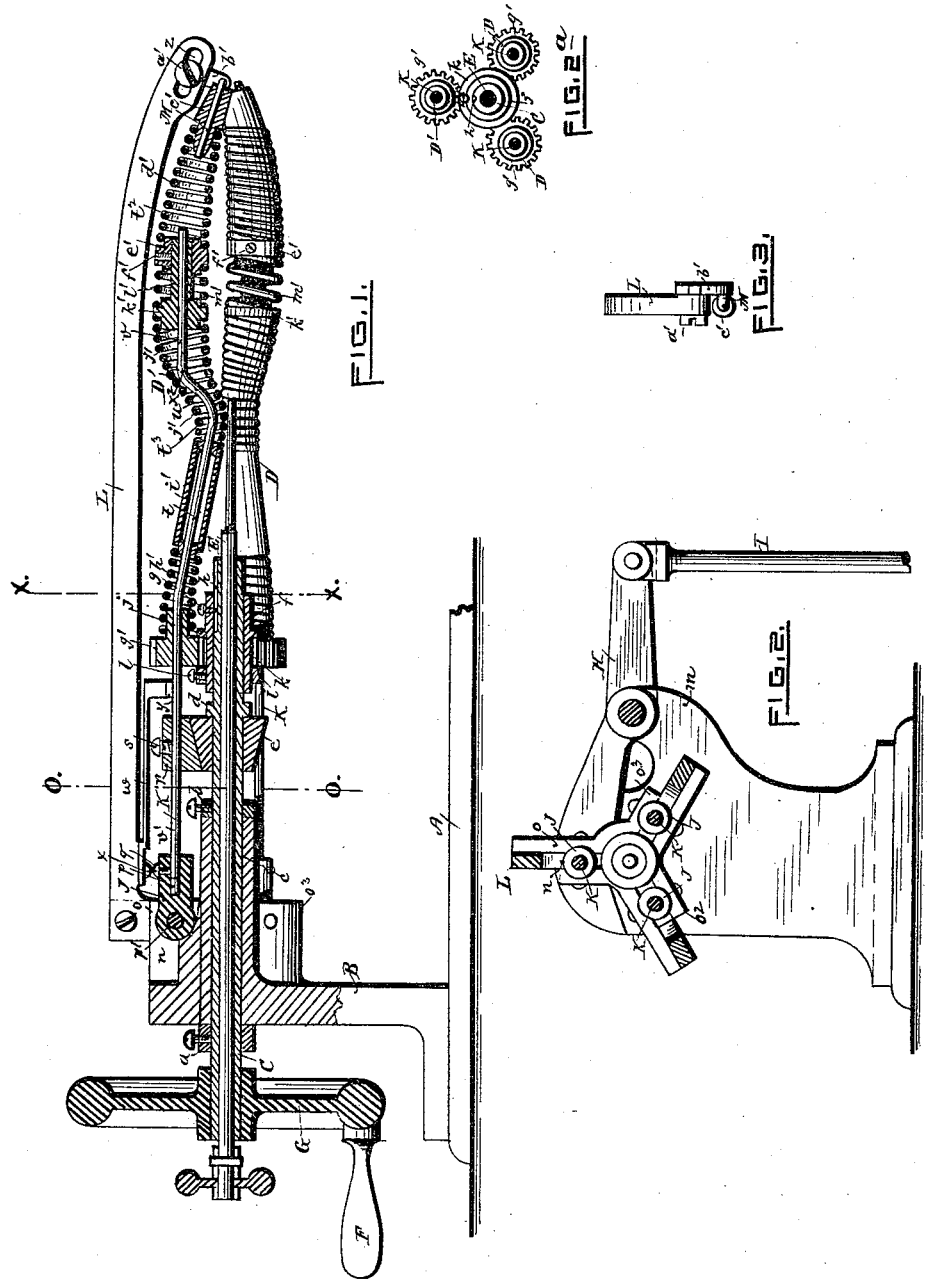

UNITED STATES PATENT OFFICE.

WALTER A. PECK AND RICHARD A. BRIGHT, OF PROVIDENCE, RHODE ISLAND; SAID BRIGHT ASSIGNOR TO SAID PECK.

CIGAR-WRAPPING MACHINE.

SPECIFICATION forming part of Letters Patent No. 451,735, dated May 5, 1891.

Application filed March 24, 1888. Serial No. 268,395. (No model.)

*To all whom it may concern:*

Be it known that we, WALTER A. PECK and RICHARD A. BRIGHT, of Providence, in the State of Rhode Island, have invented a new and useful Improvement in Cigar-Wrapping Machines, of which the following is a specification.

In the employment of wrapping-machines for the manufacture of cigars it is very desirable to have the machines so constructed as to provide for the proper adjustment of the cigar-rolling devices to suit the various contours, diameters, and lengths of cigars to be manufactured, so that a single machine by adjustment alone can perform every grade of work. Heretofore there has been no machine made which in itself has been capable of said adjustment, and the required change in form of the rolls has only been effected by means of changeable rigid rolls or roll-sections which have the form desired, thus rendering it necessary for each cigar-wrapping machine to be supplied with numerous sets of rolls or roll-sections, which are to be arranged in the machine from time to time, as required, a considerable length of time being thus consumed in making the required change by the removal of the previously-employed rolls or roll-sections and substituting others therefor.

It is the object of our invention to provide a cigar-wrapping machine in which the cigar-forming roll or a section thereof is made capable of the adjustment required without necessitating the removal and substitution of parts.

Our invention consists in a flexible roll or roll-section which is adapted to be supported for revolution in a curved or deflected position, with means for adjusting the degree of curvature or deflection to properly embrace a cigar-bunch of any desired contour and roll the final wrapper thereon.

It also consists in improved means for changing the capacity of the rolling-chamber between a series of flexible cigar-forming rolls to provide for the manufacture of cigars having different diameters.

It also consists in improved means for changing the length of the rolling-chamber between a series of flexible cigar-forming rolls to provide for the manufacture of cigars having different lengths.

Figure 1 represents a vertical longitudinal section of a cigar-wrapping machine embodying our improvement. Fig. 2 represents a vertical transverse section taken in the line *o o* of Fig. 1. Fig. 2ᵃ represents a vertical transverse section taken in the line *x x*. Fig. 3 represents an end view of the supporting-bar and adjustable bearing for supporting the upper roll of the series. Fig. 4 is an enlarged detail section of the roll. Fig. 5 is an enlarged detail section showing the deflected core and friction-roller adapted to change the contour of the rearward section of the roll. Figs. 6 and 7 are detail views showing modifications in the construction of the roll and in the means for supporting the same.

In the accompanying drawings, A is the base-plate of the machine; B, the standard which supports the driving-shaft C, and the series of flexible rolls D D D'. The driving-shaft C is made hollow to receive the sliding forcer E, as usual in cigar-wrapping machines, and is provided with the operating-handle F, attached to a suitable arm or wheel G, located upon the rearward end of the shaft. The shaft C is properly held against endwise movement in its bearing *c* by means of the adjustable collars *a* and *b*, which are placed at the opposite ends of the said bearing. The projecting forward portion of the shaft C is provided with a collar *d*, at the inner side of which is placed the loose frusto-conical or pyramidal piece *e*, and upon the forward end of the shaft C is placed the adjustable sleeve *f*, which is secured to the said shaft by means of the set-screw *g*, the point of which enters the longitudinal groove *h* in the shaft. Upon the rearward end of the sleeve *f* is placed the collar *i*, and between the collar *i* and the flange *j* upon the sleeve *f* is placed the gear *k*, the collar *i* being secured to the sleeve *f* by means of the set-screw *l*, and the gear *k* being also secured to the sleeve *f* by means of a steady-pin or otherwise. To the arm *m*, extending back from the standard B, is pivoted the lever H, which supports the upper roll D' of the series, the said lever being adapted for operation to raise the said upper roll D' from the lower rolls D D of the series by means of a treadle, which may be operatively connected with the lever H by means of the connecting-rod I. Within a slot $n$, made in a forwardly-directed lateral projection $o$ of the lever H, is pivoted the socket-piece J, within the socket $p$ of which is secured the rear end of the curved or deflected core K, which serves to support the tuck-forming end of the roll, the said core being adjustably held within the socket $p$ by means of the set-screw $q$. Upon the core K is placed the adjustable tapering or wedge-formed piece $r$, which is secured in position upon the core by means of the set-screw $s$. The core K is provided with an inwardly-directed deflection $t$ and a corresponding outwardly-directed deflection $u$, upon which may be placed a friction-roller $a$, as shown in Fig. 5, the forward end portion of the said core being preferably in line with the shank portion $v'$. To the forward end of the lever H is also attached the bar L, which serves to properly support the forward end of the roll D', and at the under side of the bar L is secured the spring $w$, which is fastened to the said bar by means of the screw $x$, and at its forward end $y$ rests upon the upper side of the shank $v'$ of the core K. The forward end of the bar L is provided with a curved or inclined slot $z$, within which is placed the screw $a'$, which serves to fasten the bearing-core M adjustably to the bar L, the said core being secured to the arm $b'$, which engages with the said screw, and by means of the said screw and slotted arm the core M is made capable of angular adjustment with reference to the axis of the cigar-rolling pocket, so as to change the curved or deflected form of the forward flexible portion or section of the cigar-forming roll to conform to the desired contour of the head of the cigar. The roll D' may be preferably made in sections, as $t^2$ $t^3$, the forward section $t^2$ being provided with the tip $c'$, which is made of rigid material and loosely fits the angularly-adjustable core M to revolve thereon, and to the tip $c'$ is attached the flexible wire coil $d'$, which covers the vacant space between the adjacent ends of the cores K and M, and which is preferably made in tapering form to correspond generally with the tapering form of the head of the cigar. The enlarged inner end of the flexible wire coil $d'$ is also provided with the attached hollow tip $e'$, which has an adjusting set-screw $f'$. The rearward section $t^3$ of the roll D' is provided with the gear $g'$, to which is attached the flexible wire coil $h'$, connected to the sleeve $i'$, which revolves upon the inwardly-deflected portion $t$ of the core K, and to the forward end of the sleeve $i'$ is attached the wire coil $j'$, which is preferably made in tapering form to correspond generally with the tapering form of the tuck end of the cigar, and to the forward end of the wire coil $j'$ is attached the tip $k'$, which loosely fits the forward portion $v$ of the bearing-core K, the said portion $v$ being preferably about parallel with the axis of the cigar to be rolled in the machine. The bend $x^2$ of the core K is arranged to bear against the inner surface of the wire coil $j'$ at the upper side of the said coil, and thus the adjusted position of the bend $x^2$ relatively to the said inner surface of the coil by the endwise movement of the core can be made to change the contour of the roll-section $t^3$. The tip $k'$ is provided with the forwardly-projecting hollow stem $l'$, which loosely enters the cavity of the tip $e'$ of the forward portion $t^2$ of the roll, the said tip $e'$ being made adjustable upon the stem $l'$ of the tip $k'$ by means of the set-screw $f'$, and between the adjacent ends of the flexible roll-sections $t^2$ and $t^3$ is placed the compressed spiral spring $m'$, which will serve to piece out the roll adjustably between the said sections. Thus as the shoulders of the tips $k'$ and $e'$ are brought nearer to each other by the proper adjustment of the said tips the spring $m'$ will be compressed, and upon adjustment in the opposite direction will be extended so as to maintain a rolling action upon the surface of the cigar between the adjacent ends of the roll-sections $t^2$ and $t^3$. The gear $g'$ engages with the gear $k$, which is adjustable upon the shaft C, the gear $g'$ being made to partake of the adjusting movement of the gear $k$ by means of the collar $i$ and flange $j$. The lower rolls D D of the series are supported from the projecting ears $o^2$ and $o^3$ of the standard B, and are constructed and held in the same manner as the upper roll D', above described, and whenever the series of rolls are properly closed upon a cigar-bunch the rotation of the shaft C, by means of the handle F or otherwise, will cause the rolls D D D' to revolve in the same direction with each other, thus imparting rotation to the inclosed bunch for rolling on the wrapper.

Whenever it is desired to adjust the machine to change the form of the head of the cigar, the screw $a'$ is to be loosened and the bearing-core M set at the proper angle to give the required form to the flexible roll-section $t^2$ and secured at said angle, by again tightening the screw $a'$, and whenever it is desired to make adjustment to change the length of the cigar the said adjustment can be effected by properly adjusting the tips $e'$ and $k'$ by means of the screw $f'$ and making the proper corresponding adjustment of the gear $k$ upon the shaft C by means of the screw $g$ and also moving the bearing-core K back farther into its socket in the pivoted piece J; and whenever it is desired to make the adjustment to change the contour of the tuck end of the cigar the endwise adjustment of the curved or deflected core K alone by changing its position within its socket $p$ and the wire coil $j$ will cause the required change in the curve of the bearing-surface of the roll-section $t^3$, and to change the diameter of the cigar the proper adjustment of the tapering piece $r$ upon the bearing-core K by means of the set-screw $s$ will cause the required angular movement of the spring-operated bearing-core K upon the pivot $p'$ to produce the required change, the teeth of the gears $k$ and $g'$ interlocking sufficiently for this purpose.

An enlarged detail section of our improved cigar-forming roll is shown in Fig. 4, in which the bend $x^2$ of the core K is extended outward from the line of the outer surface of the portion $v$ of the said core, and thus has a greater effect in changing the contour of the roll-section for any specific endwise adjustment of the core, and in the detail section, Fig. 5, we have shown a preferable construction, in which a friction-roller $a^4$ is employed instead of the outward bend $x^2$, (shown in Fig. 4,) the outer portion of the periphery of the roller being made to extend outward beyond the line of the outer surface of the portion $v$ of the core K.

A modification in the construction of the cigar-forming roll is shown in Fig. 6, in which the tip $c^2$ of the forward flexible section of the roll is provided with a bearing-journal O instead of running upon the angularly adjustable bearing-core M, and in this case the bearing-piece $f^2$ is made angularly adjustable by means of the screw $a'$.

Another modification in the construction of the flexible roll is shown in Fig. 7, in which the roll is formed of the rigid sections $i^2$ and $j^2$, which are connected to each other by means of the ball-and-socket universal joint $k^2$, the deflected section $i^2$ being held at its forward end by means of the ball-and-socket joint $l^2$, so that the proper angular adjustment of the pivoted core K', by means of the tapering or wedge formed piece $r$, as before described, will serve to change the form and diameter of the cigar.

We claim as our invention—

1. A flexible cigar-forming roll supported for revolution in a curved position and provided with means, substantially as described, whereby its form or contour may be adjusted to adapt it to form cigars of any desired shape, substantially as set forth.

2. A cigar-forming roll having its forward section supported for revolution in a curved or deflected position and provided with means, substantially as described, for adjusting the form or contour of said forward section, whereby the shape or contour of the head of the cigar may be varied as desired.

3. A cigar-forming roll having its rearward section supported for revolution in a curved or deflected position and provided with means, substantially as described, whereby the shape or contour of the tuck end of the cigar may be varied, substantially as set forth.

4. A flexible cigar-forming roll supported for revolution in a curved or deflected position and provided with means, substantially as described, for adjusting the same to operate upon cigars of different diameters, substantially as set forth.

5. A flexible cigar-forming roll composed of sections supported for revolution in a curved or deflected position and provided with means, substantially as described, for adjusting the same to operate upon cigars of different lengths, substantially as set forth.

6. A flexible cigar-forming roll supported for revolution in a curved or deflected position and having a curved or deflected bearing-core made adjustable in the direction of its length, whereby the contour of the tuck-forming end of the roll may be adjusted, substantially as described.

7. A flexible cigar-forming roll supported for revolution in a curved or deflected position and provided at its forward end with an angularly-adjustable bearing, whereby the contour of the cigar may be changed, substantially as described.

8. A flexible cigar-forming roll supported for revolution in a curved or deflected position and provided at its rearward end with an angularly-adjustable bearing-core, whereby the diameter of the cigar may be changed, substantially as described.

9. A flexible cigar-forming roll supported for revolution in a curved or deflected position and having two or more flexible roll-sections provided with interlocking tips, and means, substantially as described, for adjusting said tips lengthwise with reference to each other to change the length of the roll, substantially as described.

10. A flexible cigar-forming roll supported for revolution in a curved or deflected position and having flexible roll-sections provided with interlocking tips, and means, substantially as described, for adjusting said tips lengthwise with reference to each other to change the length of the roll, and the intermediate filling for maintaining the surface of the roll between the oppositely-positioned shoulders of the tips, substantially as described.

WALTER A. PECK.
RICHARD A. BRIGHT.

Witnesses:
SOCRATES SCHOLFIELD,
JOHN S. LYNCH.